Nov. 8, 1966

SACHIO MAEDA ET AL 3,284,327
ELECTROLYTIC MACHINING PROCESS USING
A GAS-CONTAINING ELECTROLYTE

Filed June 4, 1963 3 Sheets-Sheet 1

United States Patent Office 3,284,327
Patented Nov. 8, 1966

3,284,327
ELECTROLYTIC MACHINING PROCESS USING A GAS-CONTAINING ELECTROLYTE
Sachio Maeda, Nagao Saito, and Shinji Arai, all of Amagasaki, Hyogo Prefecture, Japan, assignors to Mitsubishi Denki Kabushiki-Kaisha, Toyko, Japan
Filed June 4, 1963, Ser. No. 285,318
Claims priority, application Japan, June 8, 1962, 37/23,686; Sept. 20, 1962, 37/40,885; Sept. 24, 1962, 37/41,743
2 Claims. (Cl. 204—143)

This invention relates to an electrolytic machining process of machining metallic members by utilizing the phenomenon that when an electrolyte is electrolyzed, an anode electrode is electrolytically eroded, and an apparatus for carrying out the same.

As well known, any workpiece of metallic material can be electrolytically machined by disposing the workpiece oppositely to a machining electrode so as to form a machining gap therebetween, circulating an electrolyte through the machining gap, and applying a positive potential to the workpiece while applying a negative potential to the machining electrode to electrolyze that portion of the electrolyte flowing through the machining gap to electrolytically erode the workpiece whereby the workpiece is formed with a recess, an opening or the like similar in configuration to the machining electrode. The electrolytic machining above outlined can be very beneficially used particularly in forming recesses and openings of very complicated configuration in metallic workpieces and in boring bodies of extremely hard metallic materials.

A general object of the invention is to provide a novel and improved process of effecting electrolytic machining and an apparatus for carrying out the same.

The chief object of the invention is to render the finished work surface of a metallic workpiece smooth by eliminating any cavitation which might be otherwise formed at the same position in a flow of machining electrolyte through a machining gap between the workpiece and a machining electrode to thereby ensure that the workpiece includes on the machined surface no streak formed by the cavitation.

Another object of the invention is to effect precise electrolytic machining at a very high flow rate of a machining electrolyte passing through a machining gap by reducing the viscosity resistance of the electrolyte supplied to the machining gap and also by decreasing a resistance of a passage through which the electrolyte flows, presented to the electrolyte. An accessory object is to eliminate short and arc discharge across the machining gap induced by impurities and the like contained in the electrolyte and to completely prevent the occurrence of ignition of a mixture of air and hydrogen evolved during electrolyzing operation, that is of explosion fault whereby an operator is protected from such fault.

A further object of the invention is to feed a machining fluid under a considerably high pressure to a machining gap without the use of any rotary pump or the like, whereby any disadvantage due to the use of such pump is eliminated. If a rotary pump is used a lubricant for the same may be admixed with the machining fluid as an impurity which may cause the machining gap to short. Thus an accessory object is to prevent a machining gap from shorting resulting from such impurity whereby a machining efficiency is improved.

A more special object of the invention is to provide an improved process of an apparatus for electrolytically machining workpieces of special metallic materials such as iron, steel, aluminum, stellite, and extremely hard alloys in an extremely easy manner.

According to the invention there is provided a process of electrolytically machining a workpiece of metallic material, comprising the steps of disposing the workpiece oppositely to a machining electrode so as to form a machining gap therebetween, feeding into said machining gap a machining fluid under pressure including a machining electrolyte and a gas admixed therewith, and applying a direct current voltage across said workpiece and said machining electrode while maintaining said workpiece positive with respect to said machining electrode to electrolyze that portion of the said machining fluid fed into said machining gap to thereby form on the workpiece a removed portion similar in configuration to the machining electrode.

The gas to be admixed with the machining electrolyte may advantageously be any suitable gas such as nitrogen, carbon dioxide, air, hydrogen, oxygen or the like.

Preferably, a gas may be admixed with a machining electrolyte in an amount equal to at least 50% by volume of the electrolyte calculated under one atmosphere.

According to another aspect of the invention there is provided an apparatus for electrolytically machining a workpiece of metallic material, comprising electrode means adapted to be connected to a negative terminal of a source of electric power, means for disposing the workpiece oppositely to said electrode means so as to form a machining gap between said workpiece and said electrode means, said workpiece being connected to the positive terminal of said source, and means for feeding into said machining gap a machining fluid under pressure including a machining electrolyte and a gas admixed therewith.

Said means for feeding said machining fluid may include a duct adapted to communicating with said machining gap, first supply means connected to said duct to supply said electrolyte to said duct and second supply means connected to said duct to supply to said duct said gas higher in pressure than said electrolyte for crushing the gas into said electrolyte flowing said duct. Alternatively said means for feeding said machining fluid include a duct adapted to communicate with said machining gap, first supply means connected to said duct to supply said gas to said duct, second supply means connected to said duct to supply said gas to said duct, and means operatively coupled to said first and second supply means to admix said electrolyte in the form of a mist with said gas flowing through said duct.

Said first supply means may conveniently include any suitable pump. Alternatively, in order to avoid the use of a pump including a moving member or members, the machining electrolyte may be advantageously accommodated in a closed reservoir.

According to the another aspect of the invention, there is provided a machining electrolyte comprising an aqueous solution of sodium chloride and sodium hydroxide in order to effect electrolytic machining of iron, steels or aluminum.

For extremely hard alloys including tungsten carbide and cobalt, machining electrolyte is effective including sodium chloride and sodium nitrate.

The invention will become more readily apparent from the following detailed description of certain embodiments of the invention illustrated by way of example in the accompanying drawings in which.

Throughout several figures like reference numerals designate similar components.

Figure 1:
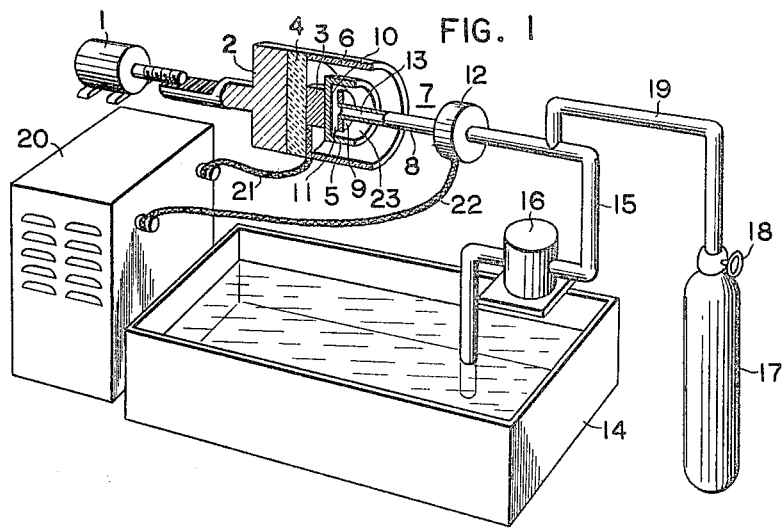
FIG. 1 shows a perspective view, partly in vertical section of an electrolytic machining apparatus constructed in accordance with the teachings of the invention.
Figure 2:
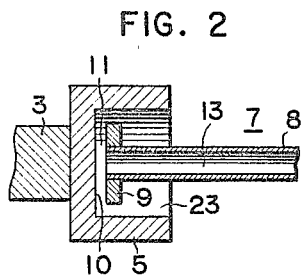
FIG. 2 shows a fragmental sectional view, in enlarged scale of a machining unit of the apparatus illustrated in FIG. 1.

Referring now to FIG. 1 of the drawings, there is illustrated an electrolytic machining apparatus constructed in accordance with the teachings of the invention. The apparatus illustrated comprises a servo mechanism 1 including an electric motor and the associated members for adjusting a machining gap as will be later described, a movable cylindrical member 2 adapted to be longitudinally moved under the control of the servo mechanism and provided on that end thereof remote away from the servo mechanism with an enlarged head. Rigidly secured to the head of the movable cylindrical member 2 is a mounting base member 3 intermediate of an electrically insulating plate 4. A workpiece 5 is removably secured on the free surface of the mounting base member 3 and surrounded by a cylindrical enclosure 6 attached at one end to the insulating plate 4. A machining electrode assembly generally designated by the reference numeral 7 includes a hollow shank 8 and a machining apertured electrode of disk type 9 rigidly secured to the outer periphery of the shank at one end and loosely extending through an opening formed on the top of the enclosure 6. The machining electrode 9 is adapted to face a work surface 10 of the workpiece 5 with a machining gap 11 formed therebetween as best shown in FIG. 2. The shank 8 has the other end portion extending through an electrode holder 12 and rigidly secured thereto and an axial bore 13 opening into the machining gap 11 for the purpose to be apparent hereinafter.

An open tank 14 containing therein a machining electrolyte as will be later described is disposed directly below the machining gap 11. A duct 15 for feeding the electrolyte includes one end portion immersed in the electrolyte contained in the open tank 14 and the other end operatively connected to the axial bore 13 in the electrode shank 9. Disposed in the duct 15 is a device 16 for circulating the electrolyte, such as a pump.

The apparatus also includes a gas device 17 such as a gas bomb filled with any suitable gas for example nitrogen under pressure. The device 17 is operatively connected to the axial bore 13 through a reducing valve 18 and a feed gas duct 19. As shown, the reducing valve 18 is disposed at the exit of the gas bomb 17 and serves to reduce the pressure of the gas leaving the bomb to a proper magnitude.

In order to apply an operating voltage across the workpiece 5 and the machining electrode 9, any suitable source of direct voltage 20 is provided having its positive side connected to the workpiece 5 through a lead 21 and the mounting base member 3 and its negative side connected to the machining electrode assembly 7 through a lead 22 and the electrode holder 12.

In operation, the device 16 for circulating the electrolyte is driven to pump the electrolyte up from the electrolyte tank 14 and simultaneously the valve 8 is opened to permit the gas such as nitrogen under a suitable pressure to enter the feed duct 19 to be admixed with the electrolyte coming from the duct 15. The resulting mixture of the electrolyte and the gas is fed, as a machining fluid, into the machining gap 11 through the axial bore 13 in the electrode shank 8. The machining fluid fed into the machining gap 11 impinges first upon the work surface 10 of the workpiece 5 and then spreads radially in every direction about the point on the work surface 10 where it has impinged. Thus the admixed fluid flows outwardly through the machining gap 11 along the work surface 10 until the same will be forcibly spouted through a space between the peripheral surface of the electrode disk 9 and the work surface 10. The spouted fluid is separated into the gas and the electrolyte which, in turn, strikes against the enclosure 6 to drop into the electrolyte tank 14.

With the workpiece 5 and the working electrode assembly 7 serving as an anode and a cathode electrode respectively, the electrolyte contained in the machining fluid as flowing through the machining gap 11 is subject to electrolysis in the well known manner. This electrolysis of the electrolyte dissolves into the same an element metal or metals on that portion of the workpiece 5 opposing the machining electrode 9 and as the electrolysis proceeds said portion of the workpiece 5 is progressively carved into a shape similar to that of the electrode 9 in this case a circular shape. Under these circumstances, the servo mechanism 1 can be driven to feed the workpiece 5 toward the machining electrode assembly 7 to thereby progressively deepen the carved recess. The servo mechanism 1 is continued to be driven until a desired recess or opening 23 will be formed having its bottom surface complement to the operating surface of the electrode 9 and its cross-section substantially corresponding to the profile of the same. It may be said that such recess or opening 23 is similar in configuration to the machining electrode.

From the foregoing it will be appreciated that, according to the invention a machining fluid includes an electrolyte and a gas admixed thereto. Now, the pressure of this machining fluid as flowing through the machining gap 11 will be discussed. When impinging upon the work surface 10 of the workpiece 5 the fluid under pressure has its maximum pressure and then gradually decreases in pressure as the same flows through the machining gap 11 toward the periphery. Finally, the fluid will leave the machining gap 11 under its pressure substantially equal to the atmospheric pressure. It will be readily understood that the gas entrained by the machining fluid has its volume varying with this change in pressure of the latter. Thus, the gas will expand as the mixture flows through the working space 11 toward the periphery. This expansion of the gas serves to strongly disturb the flow of electrolyte-gas mixture through the working space 11.

Figure 3A:
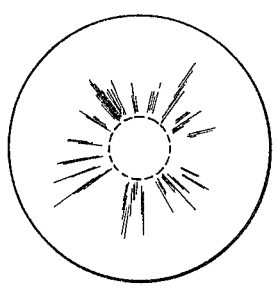
FIGURES 3a and 3b show plan views of work surfaces of workpieces machined according to the prior art process and the present process respectively.

In the conventional type of electrolytic machining apparatus using an electrolyte including no gas admixed thereto, the electrolyte fed into a machining gap through a bore for supplying the same flows through the machining gap in a manner similar to that above described in conjunction with FIG. 1. Since the electrolyte is fed into the machining gap at a considerably high rate radial cavitations will be established in the machining gap about that exit of the electrolyte supplying bore resulting from minute irregularity of said exit, irregularity of the work surface and machining electrode, any deflection of the flow of electrolyte and the like. It is to be noted that the cavitations thus established are stationary and contact the work surface of the workpiece. Of course, those portions of the work surface contacting the cavitation are not subject to electrolysis. Thus it will be apparent that the resulting work surface of the workpiece includes radial streaks formed thereon and similar in positions and shapes to the cavitation. One example of such machined surfaces is illustrated in FIG. 3(a) where a dotted circle designates an exit of an electrolyte supplying bore projected on the surface. Therefore, smooth machined surfaces of workpieces cannot be expected to be yielded. If a workpiece is to be formed on the surface with a recess such as the circular recess 23, the appearance of streaks on its bottom is greatly detrimental.

Figure 3B:
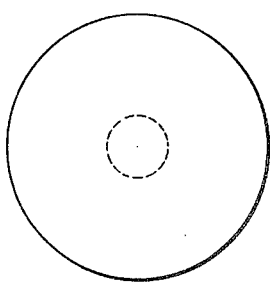

In contrast to the prior art practice, the invention contemplates to feed a machining fluid comprising a mixture under pressure of an electrolyte and a gas into a machining gap. As previously pointed out, a flow of the machining fluid under pressure through the machining gap is strongly disturbed by increase in volume of gas. It has been found that this strong disturbance of the flow of fluid makes it very difficult to generate the aforesaid cavitations even if a bore exit for supplying a machining fluid would have minute irregularity and if the work surface of a workpiece and a machining electrode would be irregular. Also, if such cavitations should be generated in the machining gap, the same will be disturbed by the gas contained in the machining fluid and continued to be moved rather than stationary. In this way, the work surface of the workpiece is electrolytically machined in uniform fashion resulting in the smooth machined surface as shown in FIG. 3(b).

Figure 4:
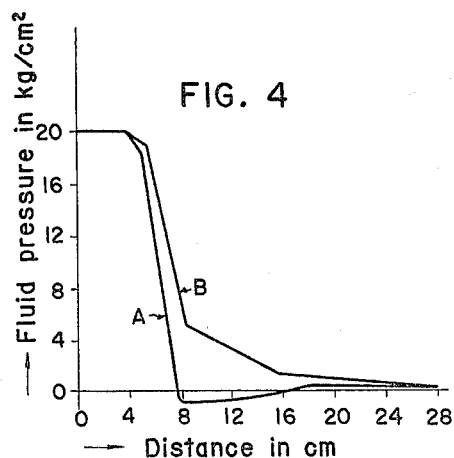
FIG. 4 shows a graph illustrating a distribution of fluid pressure in a machining gap.

FIG. 4 illustrates a graph plotting a measured pressure of a fluid flowing through the machining gap 11 versus a radial distance measured from the center of a bore exit for supplying the fluid to the gap. In FIG. 4 a curve A was obtained when as a machining fluid only an electrolyte was fed into the machining gap 11 as in the conventional electrolytic machining while a curve B obtained when a mixture of an electrolyte and gas was used according to the invention. From FIG. 4 it is appreciated that, when only the electrolyte is fed into the working space that cavitations are always generated in the same position where the pressure is negative. On the contrary, the use of the machining fluid including the electrolyte and the gas admixed thereto avoids the occurrence of such cavitations as shown in FIG. 4 by the curve B including no curve portion below the axis of abscissa.

Figure 5:
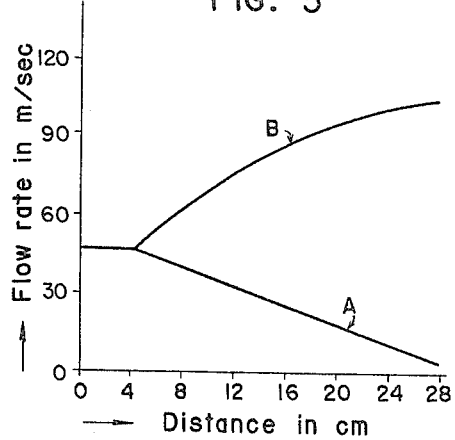
FIG. 5 shows a graph illustrating a flow rate of a fluid in a machining gap.

The use of machining fluid according to the invention has another advantage that the fluid can flow through the machining gap at a sufficiently high rate under a relatively low pressure under which the same enters the machining gap, as compared with the use of an electrolyte alone. This results from the fact that this machining fluid or the electrolyte-gas mixture flowing through the machining gap has a lower viscosity than the same electrolyte flowing through the same gas. Thus the gap exhibits a low resistance to the flow of machining fluid and accordingly is low in pressure loss. This has been verified by results of measurements of a flow rate at which a fluid flows through a machining gap such as the gap 11. These results are illustrated in FIG. 5 wherein the ordinate represents a flow rate in meters per second and the abscissa has the same meaning as in FIG. 4. A curve A illustrates a flow rate of a fluid including an electrolyte alone while a curve B a flow rate of a mixture including the same electrolyte and a gas admixed thereto. In both cases, the fluids entered the gap under the same pressure. As shown in FIG. 5, the flow rate of the electrolyte gradually decreases as the electrolyte flows through the gap toward the periphery for the reason that a passage along which the electrolyte flows increases in cross sectional area as the same flows through the gap toward the periphery. On the other hand, the electrolyte-gas mixture gradually increases in flow rate from the entrance toward the exit of the gap. The mechanism by which the flow rate of the mixture gradually increases has not yet been perfectly understood but the expansion of volume of the gas contained appears to cause the mixture to be urged outwardly whereby the latter is accelerated.

In general, if a workpiece will be subject to electrolytic machining in such a manner that the same is disposed oppositely to a machining electrode within a stationary electrolyte with a machining gap formed therebetween, that is to say, if the workpiece will be subject to electrolytic machining within the electrolyte which is not forced to flow through the machining gap then the workpiece tends to be formed with a recess different in configuration from the machining electrode resulting in the difficulty of forming on the workpiece a recess or opening similar in configuration to the electrode. If, however, the electrolyte will be caused to forcedly flow through the machining gap then the workpiece tends to be formed with a recess or opening similar in configuration to the machining electrode. This tendency for the recess to be formed on the workpiece in a configuration similar to that of the working electrode and hence the machining accuracy is greatly affected by the flow rate of the electrolyte flowing through the machining gap and generally increased as the flow rate becomes high.

Also it is well known that, upon spouting the electrolyte from a port of a feed hole, the pressure of the electrolyte is reduced in the vicinity of said port. For this reason dusts and foreign matters, if contained in the electrolyte, tend to accumulate adjacent to the supply port. The dusts and foreign matters thus accumulated may impart a high loss of pressure to the electrolyte supplied to the machining gap and reduce the flow rate thereof to deteriorate the machining accuracy. In some cases, the accumulated dusts and foreign matters may initiate to cause a short circuit across the workpiece and the machining electrode which shortcircuit, in turn is transformed into an arc discharge damaging the work surface of the workpiece and the working electrode. Further there may be even a danger that this arc discharge will fire a gaseous mixture of hydrogen evolved during electrolysis of the electrolyte and air resulting in gas explosion.

However, when the machining fluid comprising the mixture of electrolyte and gas is fed into the machining gap according to the invention the gas in the mixture can blow away all the dusts which otherwise tend to accumulate adjacent to the supply port, ensuring that both the work surface and the machining electrode are prevented from damaging as well as preventing the occurrence of gas explosion. In addition, increase in the flow rate of the machining fluid flowing through the machining gap improves the machining accuracy.

In consideration of the foregoing the gas leaving the bomb 13 through the reducing valve 18 is preferably set to have its pressure higher by from 0.5 to 10 atmospheres than the electrolyte leaving the circulating device 16 (see FIG. 1). Thus the gas can be effectively crushed in the flow of electrolyte to be intimately admixed with the same.

Figure 6:
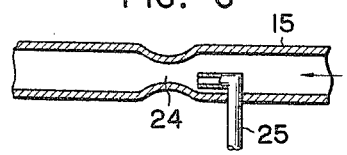
FIG. 6 shows a fragmental view, in section of mixer unit for modification admixing a gas with a machining electrolyte.

Referring now to FIG. 6 of the drawings, there is illustrated a modification of the unit for admixing a gas with an electrolyte. As shown, a duct 15 for feeding an electrolyte includes a reduced portion 24. In operation, an electrolyte flows through the duct 15 in the direction of the arrow illustrated in FIG. 6, and the reduced portion 24 decreases in pressure. This decrease in pressure permits a gas such as nitrogen to enter the duct 15 from a reservoir (not shown) through the pipe 25 to thereby be admixed with the flowing electrolyte. Then the admixed gas and electrolyte may be supplied to a machining gas such as that previously described.

Figure 7:
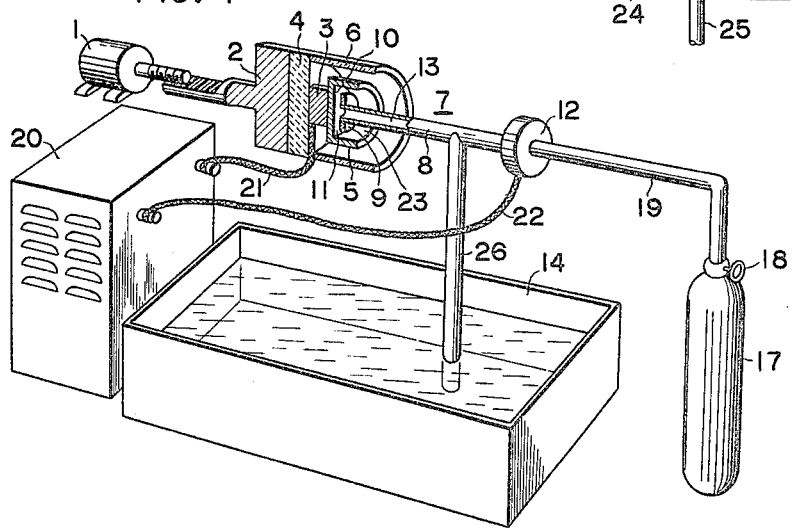
FIG. 7 shows a view similar to FIG. 1 but illustrating a modification of the invention.

Referring now to FIG. 7 of the drawings, there is illustrated a modification of the invention wherein an electrolyte is introduced into a flow of gas by utilizing the flow rate of the gas for the purpose of preparing a mixture of the electrolyte and the gas adapted to be fed into a machining gap. The arrangement shown in FIG. 7 is similar to that shown in FIG. 1 excepting that a feed electrolyte duct 26 having its lower end portion immersed into an electrolyte within a tank 14 communicates with a feed bore 13 of a machining electrode assembly 7 with a device for circulating an electrolyte being omitted. In operation, when a gas such as nitrogen from a bomb 17 is fed into a machining gap 11 through the feed bore 13, the latter is reduced in pressure due to the passage of the gas through same. This reduction in hole 13 pressure permits the electrolyte to be introduced or atomized into the flowing gas. Then the gas and the electrolyte in the form of a mist is fed into the machining gap 11. In other respects the operation is substantially identical with that of the arrangement illustrated in FIG. 1.

It is however to be noted that the arrangement of FIG. 7 enhances the aforesaid advantages obtained in the case of FIG. 1. More specifically, the machining fluid or electrolyte-gas mixture has a very low viscosity because the electrolyte is in the form of a mist and accordingly the machining gap presents a low resistance to a flow of such fluid through the same resulting in a very low loss of pressure in the gap. This permits the fluid to flow through the machining gap at a very high rate and thereby improves greatly the machining accuracy. In addition, any cavitation is not only perfectly prevented from being generated in the flow of fluid through the machining gap but also dusts and other foreign matters, if present, is entirely prevented from accumulating in the vicinity of a port for feeding fluid. This ensures that the finished workpiece has no streak and that no arc discharge takes place.

Figure 8:
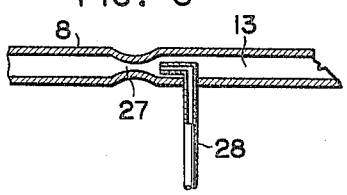
FIG. 8 shows a modification of the mixer unit illustrated in FIG. 6.

In order to introduce or atomize an electrolyte into a flowing gas by utilizing the flow rate of the gas, a device illustrated in FIG. 8 may be advantageously used. As shown in FIG. 8, a feed bore 13 formed longitudinally in an electrode shank 8 includes a reduced portion 27 and a feed electrolyte pipe 28 includes a bent end portion disposed within the hole 13 adjacent to and upstream of the reduced portion with the open end of pipe 28 directed in the direction of a flow of gas. In operation, when a gas from a reservoir (not shown) flows through the feed bore 13 the gas as passing through the reduced portion decreases in pressure. Due to this decrease in gas pressure, an electrolyte from a tank (not shown) is passed through the pipe 28 and atomized into the flowing gas. Then the atomized electrolyte entrained by the flow of gas is fed into a machining gap.

Figure 9:
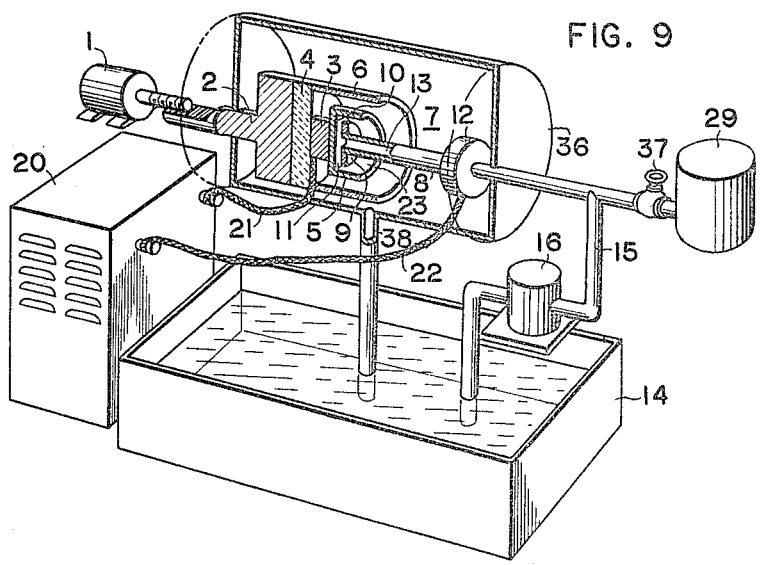
FIG. 9 shows a view similar to FIG. 1 but illustrating another modification of the invention.

Referring now to FIG. 9 of the drawings, there is illustrated another modification of the invention wherein, as a machining fluid, a mixture of an electrolyte and a non-explosive gas is fed into a machining gap. An arrangement shown in FIG. 9 is similar to that illustrated in FIG. 1 excepting that a machining unit is enclosed with a closed cover for the purpose to be later apparent. As in FIG. 1, a device 16 for circulating an electrolyte, for example, a pump can be driven to supply an electrolyte from its tank to a feed pipe 15 while a non-explosive gas such as carbon dioxide is fed from a supply 29 into the feed pipe through a reducing valve 37. Then the electrolyte and carbon dioxide are admixed with each other and fed into a machining gap 11 through a bore 13 in an electrode assembly 7.

In the electrolytic machining apparatus of the type thus far described, the electrolyte tends to scatter in the environment after the same has left the machining gap. In order to prevent this scattering of the electrolyte, it is commonly practiced to enclose the machining unit with a closed cover such as a closed cover 36 shown in FIG. 9 with the interior of the cover communicating with the electrolyte tank 14 through a return pipe 38. Under these circumstances, a gas evolved by electrolyzing the electrolyte or hydrogen evolved on the surface of the machining electrode 9 is mixed with air within the closed cover 36 until the resulting gaseous mixture will fill the interior of the cover.

With the closed cover 36 filled with the mixture of hydrogen and air and if any arc discharge will occur in the machining gap, there may be a danger that said mixture will be fired resulting in the occurrence of explosion fault.

However, when the machining gap is supplied with a gaseous mixture including an electrolyte and a non-explosive gas such as carbon dioxide, the non-explosive gas leaving the working gap fills the interior of the closed cover 36. This increases ratios of the non-explosive gas to oxygen and to hydrogen within the closed cover 36 respectively. Thus the gases confined by the cover 36 exhibit as a whole, the non-explosive property. Accordingly, if an arc discharge would occur in the machining gap no gas explosion is induced ensuring that an operator operates safely the apparatus.

Figure 10:
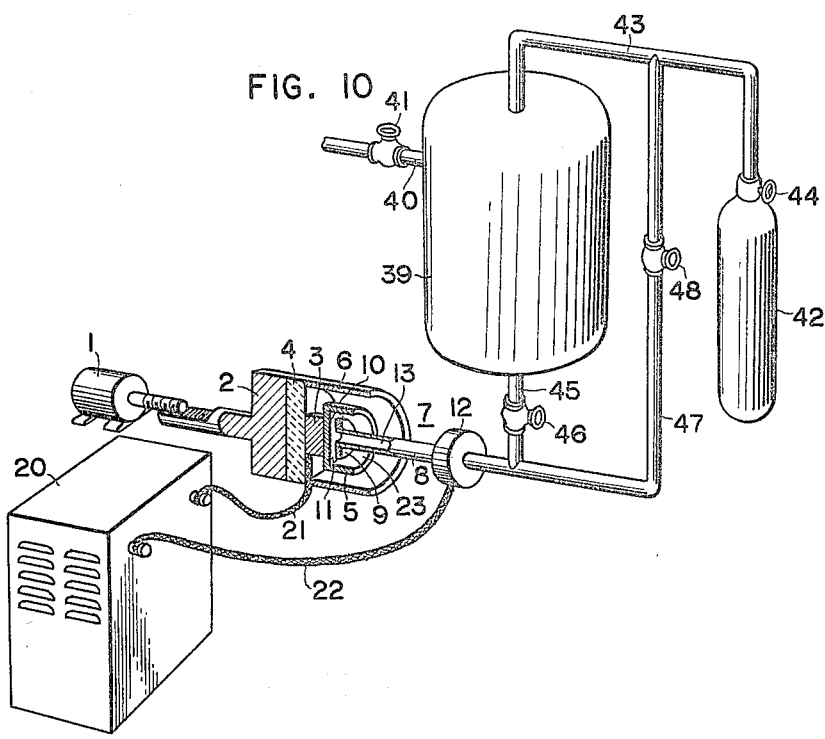
FIG. 10 shows a view similar to FIG. 1 but illustrating a further modification of the invention.

Referring now to FIG. 10 of the drawings there is illustrated still another modification of the invention wherein a device for circulating electrolyte, for example, a pump or the like is not used. An arrangement illustrated includes an electrolytic machining unit substantially identical with that previously described in conjunction with FIG. 1. Therefore, the electrolytic machining unit need not be described. Instead if an open electrolyte tank, a closed reservoir 39 is provided and includes an electrolyte (not shown) through a feed duct 40 provided with a control valve 41. As a source of gas, a bomb 42 including therein non-explosive nitrogen under pressure may be used and is coupled to the closed reservoir 39 through a feed gas pipe 43 provided with a reducing valve 44. The reservoir 39 is operatively connected to a machining electrode unit 7 through a connecting pipe 45 again provided with a control valve 46. The feed gas pipe 43 is connected directly to the connecting pipe 45 through a branch pipe 47 including a control valve 48.

In operation, the control valve 41 is first opened to feed an electrolyte from its source (not shown) into the closed reservoir 39 to pressurize the electrolyte within the same. Under these circumstances, the control valve 46 is opened to feed the pressurized electrolyte into a machining gap 11 while simultaneously the control valve 48 is opened to permit a portion of the nitrogen supplied to the reservoir to be admixed with the electrolyte leaving the same. The resulting mixture including the electrolyte and non-explosive nitrogen is fed into the machining gap 11.

The arrangement illustrated eliminates the necessity of providing a device for circulating the electrolyte, such as a pump including a moving part or parts, and ensures that the electrolyte fed into the machining gap is free from any impurity such as a lubricant used in the pump. Thus any shortcircuit which may take place by such impurity can be fully prevented from occurring resulting in great increase in the machining efficiency.

While the invention has been described in terms of non-explosive gases such as nitrogen and carbon dioxide any gas may be used with the satisfactory results. For example, a gas such as hydrogen, oxygen or the like which may incur the danger of explosion may be used with the satisfactory results provided that a measure will be used for properly removing the gas leaving a machining gap. Alternatively air may be conveniently used. However, it is to be noted that any gas harmful to an operator should not be used.

Also an electrolyte used with the invention can be properly selected dependent upon the type of material for the particular workpiece. Examples of suitable electrolytes will be subsequently described in the description of the results provided by the invention.

By using a machining electrode of circular disk type made of a brass alloy and carbon dioxide as a gas to be mixed with electrolytes, a series of workpieces made of different metallic alloys was subject to electrolytic machining whereby a circular recess was formed on each workpiece. These electrolytic machining operations were performed with a flow of machining fluid or electrolyte maintained under a pressure of 3.5 kg./cm.$^2$ and an electric current through the machining gap having a current density of 30 A./cm.$^2$. Also gaseous carbon dioxide was used in different percentages involving zero.

In the following tables, a volume ratio of electrolyte to gas was measured under one atmosphere, $R_0$ is the radius of the machining electrode, and $R_1$ and $R_2$ are radii of the finished circular recess at its upper end and at its bottom respectively. The term "smooth surface" used to express the state of machined surface means that its roughness ranges from 2 to 1 microns or less.

For a low carbon steel an aqueous solution of 20% sodium chloride was used as a machining electrolyte and the following results were obtained.

TABLE I

| Ratio of electrolyte to gas | No gas mixed | Gas mixed | | | |
|---|---|---|---|---|---|
| | 1:0 | 1:1 | 1:5 | 1:20 | 1:100 |
| Clearance at upper end ($R_1-R_0$) in mm | 2.2 | 1.8 | 1.4 | 0.7 | 0.6 |
| Clearance at bottom ($R_2-R_0$) in mm | 1.0 | 0.8 | 0.7 | 0.5 | 0.5 |
| Machined surface | (1) | (2) | (3) | (3) | (3) |

[1] Streaks appeared.
[2] Small streaks appeared.
[3] Smooth surface.

The results of experiments conducted with a high carbon steel including 0.9% carbon and an aqueous solution containing by weight, 30% of sodium chloride, 5% of sodium nitrate and 1% of sodium hydroxide are listed in the following Table II.

TABLE II

| Ratio of electrolyte to gas | No gas mixed | Gas mixed | | | |
|---|---|---|---|---|---|
| | 1:0 | 1:1 | 1:5 | 1:20 | 1:100 |
| Clearance at upper end ($R_1-R_0$) in mm | 2.0 | 1.8 | 1.2 | 0.7 | 0.6 |
| Clearance at bottom ($R_1-R_0$) in mm | 1.0 | 1.0 | 0.7 | 0.5 | 0.5 |
| Machined surface | (1) | (2) | (3) | (3) | (3) |

[1] Streaks appeared.
[2] Small streaks appeared.
[3] Smooth surface.

It has been found that, if workpieces made of the aforesaid type of high carbon steel are electrolytically machined in an aqueous solution of sodium chloride which has been commonly used in electrolytic machining that a slurry of carbon is deposited in a machining gap and may short the gap at many positions resulting in great reduction in the machining efficiency. In addition, any machined workpiece included a very rough surface on which a multiplicity of minute holes appeared. It is thought that, as iron in the high carbon steel used is dissolved in the electrolyte, free cementite initially precipitated in the steel are accumulated and deposited in the machining surface.

However, when an electrolyte used comprises an aqueous solution of sodium chloride including added thereto sodium nitrate according to the teaching of the invention, the aforesaid slurry of carbon is not deposited in the machining gap probably for the reason that the nitrate radical will prevent such deposition. This results not only in great improvement in the machining efficiency but also in the formation of very smooth surface on which the minute holes as previously described do not appear. It has been found that the aqueous solution of sodium chloride includes preferably sodium nitrate dissolved therein in an amount of from 1 to 20% by weight. Also it has been found that nitric acid may be satisfactorily used in place of sodium nitrate. For example, about 13 N nitric acid solution may be used in an amount of 0.5 to 10% by volume with the satisfactory results. It is, however, to be noted that the use of either sodium nitrate or nitric acid in an amount exceeding the respective value as above specified causes oxidation of a work surface of a workpiece to render the surface further rough.

It has been further found that the aforesaid electrolyte comprising sodium chloride and sodium nitrate or nitric acid can be equally used in electrolytically machining special tool steels such as chromium steels, tungsten steels, cobalt steels etc.

Table III shows the results of experiments conducted with aluminum and an electrolyte consisting of an aqueous solution including, by weight, 25% of sodium chloride, and 0.8% of sodium hydroxide.

TABLE III

| Ratio of electrolyte to gas | No gas mixed | Gas mixed | | | |
|---|---|---|---|---|---|
| | 1:0 | 1:1 | 1:5 | 1:20 | 1:100 |
| Clearance at upper end ($R_1-R_0$) in mm | 2.0 | 1.8 | 1.5 | 0.7 | 0.6 |
| Clearance at bottom ($R_2-R_0$) in mm | 1.2 | 1.0 | 0.7 | 0.5 | 0.5 |
| Machined surface | (1) | (2) | (3) | (3) | (3) |

[1] Streaks appeared.
[2] Small streaks appeared.
[3] Smooth surface.

It is well known that a body of aluminum left in air as it is includes an electrically insulating coating of aluminum oxide formed on its surface because of its high affinity to oxygen. If such a body of aluminum with the coating of aluminum oxide will be subject to electrolytic machining in an aqueous solution of sodium chloride used commonly, then the machining is prevented from proceeding due to the presence of the electrically insulating coating on the surface of the body. On the other hand, when an electrolyte including sodium chloride and a small amount of sodium hydroxide is used sodium hydroxide is reacted with aluminum oxide to produce sodium aluminate which, in turn, is dissolved into the electrolyte. Thus the pure aluminum surface of the body to be treated is always exposed to the electrolyte permitting an electric current to flow from the same through the electrolyte whereby the electrolytic machining proceeds.

Sodium hydroxide is preferably added to an aqueous solution of sodium chloride in such an amount that an electrolyte as a whole is weakly alkaline. As a suitable example, an electrolyte may comprise, by weight, from 10 to 30% of sodium chloride and from 0.3 to 8% of sodium hydroxide. In addition, either of sodium carbonate and potassium hydroxide has been found used in such an amount that an electrolyte as a whole is alkaline, with the satisfactory results. For example, either of from 0.7 to 12% by weight of sodium carbonate and from 0.3 to 8% by weight of potassium hydroxide may be used for an aqueous solution including from 10 to 30% by weight of sodium chloride dissolved therein. The use of an alkaline electrolyte is advantageous in that an electrolytic machining apparatus can be made of cheap metallic material such as iron because such material is not corroded by the electrolyte.

Table IV shows the results of experiments conducted with a Stellite consisting of 50% cobalt, 30% chromium, 15% tungsten and 5% iron and an electrolyte comprising an aqueous solution including by weight, 23% of sodium chloride, and 1.5% of sodium hydroxide.

TABLE IV

| Ratio of electrolyte to gas | No gas mixed | Gas mixed | | | |
|---|---|---|---|---|---|
| | 1:0 | 1:1 | 1:5 | 1:20 | 1:100 |
| Clearance at upper end ($R_1-R_0$) in mm | 2.0 | 1.8 | 1.5 | 0.7 | 0.6 |
| Clearance at bottom ($R_2-R_0$) in mm | 1.0 | 1.0 | 0.7 | 0.5 | 0.5 |
| Machined surface | (1) | (2) | (3) | (3) | (3) |

[1] Streaks appeared.
[2] Mirror surface.
[3] Smooth surface.

If a workpiece made of the above mentioned Stellite is electrolytically machined in an aqueous solution of sodium chloride then black insoluble portions remain partially on the resulting machined surface thereof which will result from tungsten in the Stellite not dissolved out in the aqueous solution. However, it has been found that the addition of sodium hydroxide to an aqueous solution of sodium chloride provides a very smooth surface because tungsten component in the Stellite is dissolved out in the solution by a chemical reaction by which sodium hydroxide is reacted with tungsten oxide formed by anode oxidation to produce sodium tungstate. An aqueous solution suitable for use as an electrolyte may preferably include from 10 to 30% by weight of sodium chloride and 0.1 to 5% by weight of sodium hydroxide. If sodium hydroxide will be used in an amount less than its lower limit just specified the same is difficult to react on tungsten whereas an excess of sodium hydroxide affects detrimentally the remaining ingredients or cobalt, chromium and iron. Also sodium chloride and sodium hydroxide may be replaced in equal amount by potassium chloride and potassium hydroxide respectively with the satisfactory results.

According to the teachings of the invention extremely hard sintered alloys of tungsten carbide-cobalt system and tungsten carbide-titanium carbide-cobalt system and the like can be electrolytically machined with the excellent results.

Table V shows the results obtained when workpieces made of an extremely hard sintered alloy including, by weight, 93% of tungsten-carbide and 7% of cobalt were electrolytically machined in a flow of aqueous solution including, by weight, 15% of sodium hydroxide and 12% of sodium chloride.

TABLE V

| Ratio of electrolyte to gas | No gas mixed | Gas mixed | | | |
|---|---|---|---|---|---|
| | 1:0 | 1:1 | 1:5 | 1:20 | 1:100 |
| Clearance at upper end ($R_1-R_0$) in mm | 2.0 | 2.8 | 2.5 | 0.7 | 0.6 |
| Clearance at bottom ($R_2-R_0$) in mm | 1.0 | 1.0 | 0.7 | 0.5 | 0.5 |
| Machined surface | (¹) | (²) | (²) | (²) | (²) |

¹ Streaks appeared.
² Slightly lustrous smooth surface.

Since, as previously described, sodium hydroxide serves to dissolve tungsten away in an electrolyte, electrolytic machining of the sintered alloy containing tungsten can be rapidly performed. It is noted that sodium chloride serves to dissolve cobalt away in the electrolyte. In order to properly dissolve cobalt away in an electrolyte and to prevent chlorine ions in sodium chloride from decreasing anode oxidation of tungsten carbide, the proportion of sodium chloride should preferably range from 4 to 20% by weight. Also sodium hydroxide is required to be higher in amount than sodium chloride for the reason that if its amount is too low tungsten carbide decreases in an amount with which the same is dissolved away in the electrolyte. Thus the proportion of sodium hydroxide ranges preferably from 10 to 30% by weight. Further, sodium chloride and sodium hydroxide may be replaced in equal amount by potassium chloride and potassium hydroxide respectively with the satisfactory results.

As above described the aqueous solution including sodium chloride and sodium hydroxide is effective for the sintered tungsten carbide-cobalt alloys. However, that solution has been found ineffective for sintered tungsten carbide-titanium carbide-cobalt alloys. This appears to result from preventing of titanium carbide from dissolving away in the solution. Since it is true that, if titanium carbide will be anode oxidized to be converted into titanium oxide the latter is reacted with sodium or the like the cause for which the above mentioned solution is ineffective is considered to be that chlorine ions in the solution will prevent anode oxidation of titanium carbide. Considering this, an electrolyte for WC-TiC-Co alloys has been provided including sodium hydroxide and sodium nitrate but not chlorine ions. Sodium hydroxide serves to react upon titanium oxide converted from tungsten carbide to produce soluble sodium tungstate and also to react upon titanium oxide converted from titanium carbide to produce soluble sodium titanate while sodium nitrate is principally effective for dissolving cobalt. The results of experiments indicated that an amount of sodium hydroxide preferably ranges from 4 to 20% by weight with an amount of sodium nitrate ranging from 2 to 15% by weight. Sodium hydroxide and sodium nitrate may be replaced in substantially equal amount by potassium hydroxide and potassium nitrate respectively with the satisfactory results.

Experiments were conducted with an extremely hard sintered alloy including 86% tungsten carbide, 9% titanium carbide and 5% cobalt and an electrolyte comprising an aqueous solution including 15% of sodium hydroxide and 8% of sodium nitrate and their results are shown in Table VI.

TABLE VI

| Ratio of electrolyte to gas | No gas mixed | Gas mixed | | | |
|---|---|---|---|---|---|
| | 1:0 | 1:1 | 1:5 | 1:20 | 1:100 |
| Clearance at upper end ($R_1-R_0$) in mm | 2.0 | 1.8 | 1.6 | 0.7 | 0.6 |
| Clearance at bottom ($R_2-R_0$) in mm | 1.1 | 1.0 | 0.7 | 0.5 | 0.5 |
| Machined surface | (¹) | (²) | (²) | (²) | (²) |

¹ Streaks appeared.
² Slightly lustrous smooth surface.

From Tables I through VI it will be apparent that the high proportion of the gas admixed with the electrolyte leads to improvement in the machining accuracy and also to render the machined surface smooth. From the above and other experiments it has been found that a gas may be preferably used in an amount equal to at least 50% of an electrolyte calculated under one atmosphere.

From the foregoing, it will be appreciated that the objects of the invention have been accomplished by the use of an aqueous electrolyte including admixed thereto a gas. Also there have been provided the unique electrolytes suitable for electrolytically machining various metallic materials.

What we claim is:

1. A process of electrolytically machining a workpiece of metallic material, comprising the steps of disposing the workpiece oppositely to a machining electrode so as to form a machining gap therebetween, feeding and circulating a machining liquid electrolyte into and through said machining gap at a reduced pressure, admixing gas from an external source with said machining liquid electrolyte prior to feeding said machining liquid electrolyte into the machining gap, said gas being admixed with said machining liquid electrolyte in an amount corresponding to at least 50% by volume of the machining liquid electrolyte fed into said machining gap, calculated at a pressure of one atmosphere, and said amount of gas being controlled to prevent the formation of a mist at said reduced pressure, and applying a direct current voltage across said workpiece and said machining electrode while maintaining said workpiece positive with respect to said machining electrode to electrolyze said machining liquid electrolyte flowing through said machining gap thereby to machine said workpiece into a configuration complementary to that of said machining electrode.

2. A process as defined in claim 1, wherein said gas is non-explosive.

References Cited by the Examiner
UNITED STATES PATENTS

| | | | |
|---|---|---|---|
| 2,758,075 | 8/1956 | Swalheim | 204—277 X |
| 3,002,907 | 10/1961 | Williams | 204—143 |
| 3,019,178 | 1/1962 | Williams | 204—143 |
| 3,053,747 | 9/1962 | Di Maggio | 204—224 |
| 3,058,895 | 10/1962 | Williams | 204—143 |
| 3,075,903 | 1/1963 | Da Costa et al. | 204—143 |
| 3,192,146 | 6/1965 | Vellas et al. | 204—240 |
| 3,214,360 | 10/1965 | Bender et al. | 204—224 |
| 3,239,438 | 3/1966 | Voorhees | 204—143 |

FOREIGN PATENTS 147,080   7/1962   Russia.

OTHER REFERENCES

Kehl, Geol. L. et al.: Electrolytic Cutting of Metals, Bulletin No. NYO–3166, United States Atomic Energy Commission, November 1, 1951, pages 4–15.

JOHN H. MACK, *Primary Examiner.*

HOWARD S. WILLIAMS, *Examiner.*

R. MIHALEK, *Assistant Examiner.*